United States Patent [19]

Hoffman et al.

[11] 3,831,435
[45] Aug. 27, 1974

[54] SILVER-FOIL PSYCHROMETER FOR MEASURING LEAF WATER POTENTIAL

[75] Inventors: Glenn J. Hoffman, Colton; Stephen L. Rawlins, Riverside, both of Calif.

[73] Assignee: The United States of America as represented by the Secretary of Agriculture, Washington, D.C.

[22] Filed: Apr. 6, 1973

[21] Appl. No.: 348,584

[52] U.S. Cl. .................................................. 73/77
[51] Int. Cl. ......................................... G01n 25/62
[58] Field of Search....................... 73/73, 77, 338

[56] References Cited
UNITED STATES PATENTS
3,739,629  6/1973  Campbell................................ 73/77

OTHER PUBLICATIONS

Zollinger et al., "A Comparison of Water-Potential Measurements Made Using Two Types of Thermocouple Psychrometers," in Soil Science, Vol. 102, No. 4, 1966, p. 231–239.

*Primary Examiner*—Herbert Goldstein
*Attorney, Agent, or Firm*—M. Howard Silverstein; W. Takacs

[57] ABSTRACT

An miniature apparatus for measuring the water potential of leaves in situ without temperature control. The apparatus includes a metal disk with a central cavity, a pair of thermally conductive washers mounted on the bottom of the disk, a reference thermocouple connected to each washer, and a measuring thermocouple located in the cavity. The thermocouples are connected in series.

2 Claims, 4 Drawing Figures

PATENTED AUG 27 1974          3,831,435

SILVER-FOIL PSYCHROMETER FOR MEASURING LEAF WATER POTENTIAL

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of miniature apparatus and method for determining water potential of leaves in situ, that is, while the leaves are in a living condition and still attached to the plant of which they are a part. It is also an object of the invention to provide means whereby said measurement is made without controlling the temperature of the leaf. Further objects of the invention will be evident from the following description wherein parts and percentages are by weight unless otherwise specified.

Most plants absorb necessary water from soil by means of a complex root system. The water travels to the leaves of the plant through a network of cells. A typical plant uses only about one to two per cent of absorbed water for nutritional purposes; the remainder is lost through transpiration, a phenomenon defined as the evaporation of water from the leaves of the plant. This water loss is critical in that, if replacement is not made quickly, the plant will wilt and die. Usually, water lost through transpiration is rapidly replaced by water absorbed by the roots from the soil. This absorption is explained more fully as follows: When water is lost during transpiration, a water potential gradient is created, and this gradient is transmitted along the cellular pathway to the roots and finally to the root hairs. In response to this water potential gradient, water is absorbed from the surrounding soil. The greater the rate of transpiration, the lower the water potential in the leaf, resulting in a larger water potential gradient.

It is evident, therefore, from the above discussion that measurement of the water potential of an individual leaf is the best means for ascertaining the point at which the plant needs water and thus would be useful in determining when to irrigate.

Psychrometers for measuring leaf water potential are known. To prevent errors introduced by temperature fluctuations, it is common practice to carry out the determination on excised (detached) leaves whose temperature can be controlled, that is, maintained at a predetermined level by the use of a constant temperature bath or the like. Such measurements are awkward to perform because of the necessary but cumbersome temperature control devices. Moreover, such devices do not provide up-to-date information because growing conditions may change while the measurement is being taken so that the results do not present the current state of the plant. Also, such techniques are particularly awkward and time-consuming where it is desired to monitor a plant on a periodic basis—such as hourly or the like—because they require detachment of a leaf, bringing the leaf to the predetermined temperature, making the measurement, and repeating the whole process over and over again at the prescribed periodic intervals.

The invention described herein provides a device which obviates the problems outlined above. The thermocouple psychrometer of the invention is designed so that it may be attached to an intact leaf where it will remain until removed and where it will measure water potential of the leaf without attention and without temperature control. The device of the invention is miniature to minimize the effect of the device on the normal functions of the leaf. Also, since the instrument is applied to a living leaf still attached to the plent, it can be readily utilized to monitor the plant by providing water potential data at any desired periodic intervals. For this reason the invention is particularly useful for determining optimum times for applying irrigation and for studying the effects of environmental factors on plant water relations.

The invention is now described in detail in conjunction with the annexed drawing, wherein.

In the figures, various parts (e.g., elements 1, 3, 5, etc.) are shown in exaggerated thickness for purpose of clarity of representation.

Figure 1:
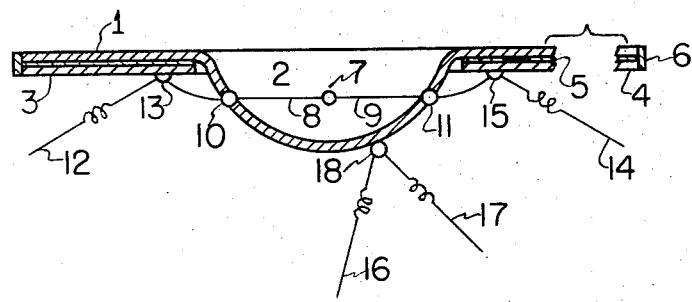
FIG. 1 is a cross-sectional view of the psychrometer of the invention.
Figure 2:
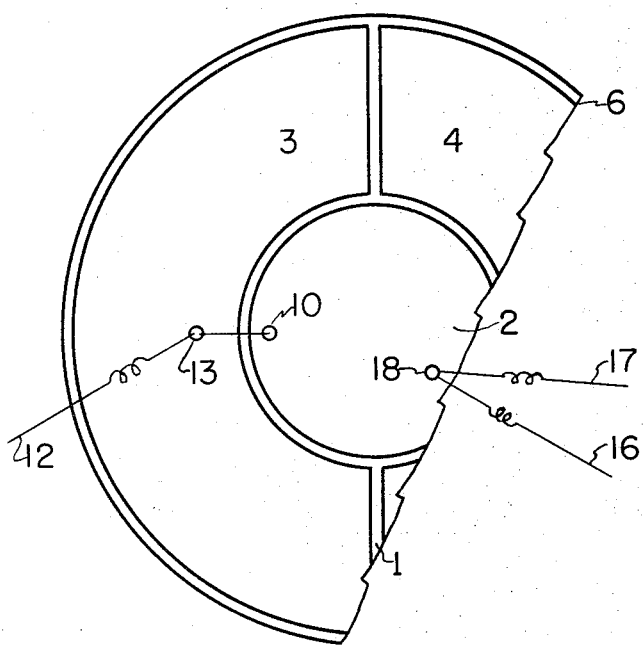
FIG. 2 is a bottom view of the device of the invention.

Referring to FIGS. 1 and 2, the main body of the psychrometer is composed of disk 1, typically made of silver foil 50 microns thick and having a diameter of about 13 millimeters.

Disk 1 has an annular flat portion and at the center is indented to provide a cup-like cavity or chamber 2, typically 1 millimeter in depth and 5 millimeters in diameter.

Mounted on the bottom of disc 1 are a pair of elements 3 and 4, termed "half-washers" because of their shape. These are also typically made of silver foil 50 microns thick. The arrangement of half-washers 3 and 4 is apparent from FIG. 2, and it may be noted that they are not in contact with one another.

Half-washers 3 and 4 are bonded to disk 1 by adhesive film 5. The adhesive material used for the purpose must provide good thermal conductivity but at the same time must be an electrical insulator. Adhesives which have such properties are available on the market. A typical one is "Permacel 18" electrical insulating adhesive film available from R. S. Hughes Co., City of Commerce, Calif.

The peripheral edge of disc 1 and half-washers 3,4 is provided with a coating 6 of epoxy resin or the like to prevent accidental electrical connection between the said parts.

The psychrometer includes an arrangement of three cooperating thermocouples which form a Peltier-type system, and is described as follows:

Positioned within chamber 2 is a measuring thermocouple including junction 7, chromel wire 8, and constantan wire 9. Wires 8 and 9 pass through the wall of chamber 2 via small bores, the wires being sealed therein by beads 10,11 of epoxy resin. In fabricating the instrument, it is obvious that the wires be centered in the bores before the epoxy resin sets to prevent short circuiting.

A first reference thermocouple is formed from wire 8 and wire 12 (copper) joined to one another and to half-washer 3 by junction 13, preferably made by silver soldering.

A second reference thermocouple is formed from wire 9 and wire 14 (copper) joined to one another and to half-washer 4 by junction 15, preferably made by silver soldering.

To preserve the miniaturized aspect of the device, the thermocouple leads are of fine wire, e.g., 8 and 9 have a diameter of 25 microns and 12 and 14 have a diameter of 50 microns.

For monitoring the temperature of chamber 2 there is provided a conventional thermocouple composed of copper and constantan wires 16,17 and junction 18, the latter being cemented to the back of chamber 2.

Figure 3:
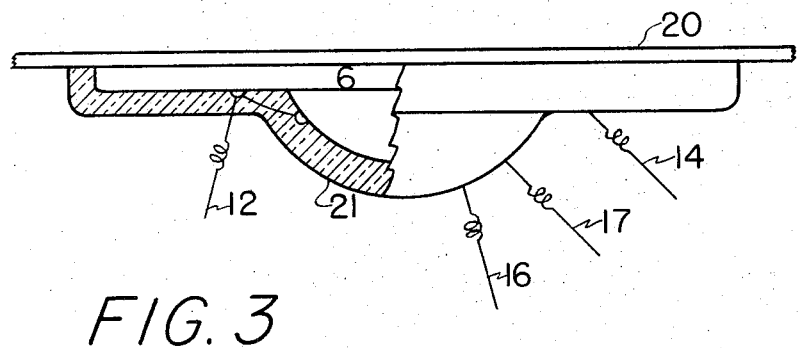
FIG. 3 is a side view, partly in cross-section, showing the psychrometer in operative condition attached to a leaf.
Figure 4:
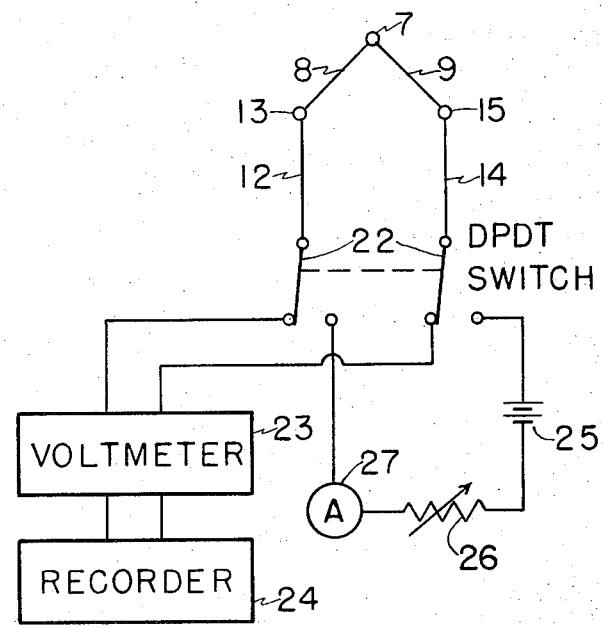
FIG. 4 is a diagram illustrating wiring connections between the psychrometer and auxiliary equipment.

The operation of the apparatus is next described in detail having reference to FIGS. 3 and 4.

The psychrometer is attached to an intact leaf 20 still in place on the plant of which it is a part. To this end, a sealant is applied to the flat annular portion of disk 1 and the apparatus pressed against the abaxial side of the leaf. As a result, chamber 2 is closed and functions as an equilibrium chamber. For sealing the apparatus to the leaf we prefer to use a silver-impregnated, water-based conductive coating because it provides a good seal and firm attachment for extended periods. The silver in the sealant provides good thermal conductivity between the leaf and disk 1. Products of this kind are available on the market, e.g., "Dynaloy-300" available from Dynaloy, Inc., Hanover, N.J. Since the temperature of the leaf may be several degrees warmer or cooler than the surrounding air temperature because of transpiration from the leaf, it is imperative to isolate the psychrometer from the air temperature so that the psychrometer may remain at the leaf temperature. To accomplish this, cap 21 of thermal insulation material is fitted over the base of the psychromter and fixed in place with an epoxy cement or the like. Cap 21 is preferably made of light-weight insulating material such as polystyrene, polyethylene, or polyurethane foam.

Reference is now made to FIG. 4. Thermocouple junctions 7, 13, and 15 are connected in series to form a Peltier system which is connected through DPDT switch 22 to voltmeter 23 and recorder 24 or alternatively to a circuit containing battery 25, variable resistance 26, and ammeter 27.

With the system connected as shown in FIG. 4, junctions 7, 13, and 15 being at the same temperature (as is normally the case), a null signal will result. Switch 22 is thrown to the other side and a small current is passed through the system. With the arrangement shown, the current passes through measuring junction 7 from the negative constantan wire 9 to the positive chromel wire 8, whereby cooling occurs at measuring junction 7 and heating occurs at reference junctions 13 and 15 by the Peltier effect. However, junctions 13 and 15 are soldered to the relatively massive half-washers 3 and 4, which act as heat sinks. As a result, their heat capacity is so high that the temperature of junctions 13 and 15 does not rise appreciably. During this phase of the operation, the amount of current passed through the junctions is regulated so that measuring junction 7 is cooled to the dewpoint temperature whereupon water condenses on it. Junction 7 thus becomes a sensitive "wet-bulb" thermometer. Thus, by throwing switch 22 back to the position shown in FIG. 4, the difference in temperature between the cooled junction 7 and the reference junctions 13 and 15 produces a minute electromotive force which is measured by voltmeter 23 and displayed on a chart or the like by recorder 24. By suitable calibration, the voltage reading is converted to a value for water potential. Generally, the psychrometer is calibrated by exposing chamber 2 to an atmosphere of known vapor pressure. Particularly useful are solutions of various salts, e.g., potassium chloride. Typically, the instrument may be calibrated by subsituting for leaf 20, pieces of a filter paper impregnated with aqueous solutions of KCl of known concentration, hence known vapor pressure.

For monitoring leaves at periodic intervals, switch 22 may be operated by a timer or the like so that at predetermined intervals it will be thrown from one position to the other.

Leaf temperature is monitored with the thermocouple junction shown in FIG. 1 as 18. This is done by connecting junction 18 with a reference thermocouple junction and a suitable device for measuring voltages of thermocouples. These temperature measurements are used to correct the water potential readings for temperature.

As mentioned earlier, a particular advantage of the invention is that no temperature control is required. Thus, the leaf under investigation is allowed to remain at ambient temperature, and error is avoided because the instrument assumes the temperature of the leaf. The manner in which the latter desired result is attained is explained as follows: When the apparatus is sealed to the leaf, intimate contact between the leaf and disk 1 results. Since disk 1 and the sealant are made of a very heat-conductive material, the disk is at essentially the same temperature as the leaf. Also, since the thickness of 1 is minute, the disk is very sensitive to changes in leaf temperature. Half-washers 3 and 4, also of minute thickness, are intimately associated with disk 1. As a consequence, the temperature of 3 and 4 is essentially the same as disk 1 and the leaf. Thus, the entire apparatus, by virtue of its dimensions and compositions, maintains a temperature coinciding with that of the leaf and is sensitive to temperature fluctuations of the latter.

The device of the invention was subjected to tests wherein it was applied to a copper plate simulating a leaf, and wherein the temperature of the copper plate could be varied at will. It was found that the temperature of the psychrometer stayed within 0.025° C. of the temperature of the plate when the latter temperature was changing at the rate of 1° C. per minute. From this it was calculated that leaf water potentials can be measured with a precision of ±1 bar, or better.

Having thus described our invention, we claim:

1. A miniaturized device for measuring the water potential of a leaf in situ on a living plant while the leaf remains at ambient temperature, comprising a. a disk of metal foil having a diameter smaller than the width of the leaf whose water potential is to be measured, said disk having a flat annular portion and a central cup-like cavity, said cavity forming a closed equilibrium chamber in conjunction with the leaf when the device is in operative position sealed to the surface of the leaf, b. a measuring thermocouple junction mounted within said cavity, c. a pair of half-washers of metal foil mounted on the bottom of said disk and extending around the flat portion thereof, being cemented in place with a thin film of a thermally conductive but electrically insulating adhesive material, d. a pair of reference thermocouple junctions, each being soldered to one of said half-washers, e. and means for electrically connecting said three thermocouples in series, whereby to provide a Peltier-type thermocouple system.

2. The device of claim 1 wherein the said disk and half-washers are made of silver foil about 50 microns in thickness.

* * * * *